US010095675B2

(12) United States Patent
Akiyama et al.

(10) Patent No.: US 10,095,675 B2
(45) Date of Patent: Oct. 9, 2018

(54) INPUTTING DATA TO A WEB PAGE

(75) Inventors: Koji Akiyama, Sagamihara (JP);
Yoshiaki Sawano, Zama (JP);
Yashuhiro Shibutani, Yamato (JP);
Yasuaki Takahashi, Yamato (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 588 days.

(21) Appl. No.: 12/470,358

(22) Filed: May 21, 2009

(65) Prior Publication Data
US 2009/0292981 A1 Nov. 26, 2009

(30) Foreign Application Priority Data

May 22, 2008 (JP) ................................ 2008-134008

(51) Int. Cl.
*G06F 17/00* (2006.01)
*G06F 17/24* (2006.01)
*G06F 3/0484* (2013.01)
*G06F 3/0486* (2013.01)

(52) U.S. Cl.
CPC ............ *G06F 17/243* (2013.01); *G06F 17/24* (2013.01); *G06F 3/0486* (2013.01); *G06F 3/04842* (2013.01)

(58) Field of Classification Search
CPC .. G06F 3/0486; G06F 3/04842; G06F 17/243; G06F 17/24
USPC .................................. 715/221–226, 769, 770
See application file for complete search history.

(56) References Cited

U.S. PATENT DOCUMENTS

| 5,544,285 | A | * | 8/1996 | Glaser | ................... G06F 3/0481 |
| | | | | | 715/224 |
| 6,088,700 | A | * | 7/2000 | Larsen | ................... G06F 17/248 |
| 6,112,215 | A | * | 8/2000 | Kaply | ................. G06F 3/04895 |
| | | | | | 707/999.104 |
| 6,192,380 | B1 | * | 2/2001 | Light | ................... G06F 17/243 |
| | | | | | 707/999.009 |

(Continued)

FOREIGN PATENT DOCUMENTS

| JP | 02-306171 A | 12/1990 |
| JP | 2000-155633 A | 6/2000 |

(Continued)

OTHER PUBLICATIONS

Heinz Tschabitscher, How to Clear Private Data, Empty Caches and Remove Cookies in Mozilla Firefox, Archived Mar. 3, 2007 http://email.about.com/od/staysecureandprivate/qt/et_clear_ff.htm.*

(Continued)

*Primary Examiner* — Cesar B Paula
*Assistant Examiner* — David Faber
(74) *Attorney, Agent, or Firm* — Fabian VanCott; Steven L. Nichols

(57) ABSTRACT

A system for inputting data to a web page that is selectively accessed and displayed through a web browser executing on a computing device includes an electronic scratch pad on the computing device that is configured to identify data entry fields on an accessed web page and to retrieve a label corresponding to any identified data entry field of the web page. The electronic scratch pad records the label and any user input that is input using a user input device to the corresponding data entry field.

20 Claims, 16 Drawing Sheets

(56) References Cited

U.S. PATENT DOCUMENTS

| | | | | |
|---|---|---|---|---|
| 6,247,029 B1* | 6/2001 | Kelley | G06F 17/243 | 715/207 |
| 6,421,693 B1* | 7/2002 | Nishiyama | G06F 17/243 | 715/225 |
| 6,499,042 B1* | 12/2002 | Markus | G06F 17/243 | 709/219 |
| 6,589,290 B1* | 7/2003 | Maxwell | G06F 17/2247 | 715/224 |
| 6,651,217 B1* | 11/2003 | Kennedy | G06F 17/243 | 715/224 |
| 7,203,699 B2* | 4/2007 | Bellamy | G06F 17/30011 | |
| 7,206,791 B2* | 4/2007 | Hind | G06F 21/6227 | |
| 7,206,998 B2* | 4/2007 | Pennell | G06F 17/243 | 705/42 |
| 7,216,292 B1* | 5/2007 | Snapper | G06F 17/243 | 715/234 |
| 7,343,551 B1* | 3/2008 | Bourdev | G06F 17/243 | 715/224 |
| 7,496,851 B2* | 2/2009 | Mendel | G06F 3/0481 | 715/763 |
| 7,523,391 B1* | 4/2009 | Eizenhoefer | G06F 3/04895 | 707/999.1 |
| 7,620,906 B2* | 11/2009 | Igeta | G06F 3/0486 | 715/759 |
| 7,877,406 B2* | 1/2011 | Crucs | G06F 17/30265 | 707/772 |
| 8,214,362 B1* | 7/2012 | Djabarov | G06F 17/243 | 707/713 |
| 2002/0013788 A1 | 1/2002 | Pennell et al. | | |
| 2002/0023108 A1* | 2/2002 | Daswani | G06F 17/243 | 715/224 |
| 2002/0062342 A1* | 5/2002 | Sidles | G06F 17/243 | 709/203 |
| 2004/0030991 A1* | 2/2004 | Hepworth | G06F 17/243 | 715/226 |
| 2004/0205526 A1* | 10/2004 | Borodovski | G06F 17/243 | 715/224 |
| 2004/0205530 A1* | 10/2004 | Borg | G06F 17/243 | 715/226 |
| 2004/0249801 A1* | 12/2004 | Kapur | G06F 17/30864 | |
| 2005/0125715 A1* | 6/2005 | Di Franco | G06F 9/451 | 715/226 |
| 2005/0198563 A1* | 9/2005 | Kristjansson | G06F 17/243 | 715/224 |
| 2005/0216356 A1* | 9/2005 | Pearce | G06F 17/243 | 715/207 |
| 2006/0179404 A1* | 8/2006 | Yolleck | G06F 17/243 | 715/272 |
| 2007/0089049 A1* | 4/2007 | Gormish | G06F 17/24 | 715/224 |
| 2007/0226783 A1* | 9/2007 | Mimlitsch | H04L 63/0815 | 726/4 |
| 2007/0250782 A1* | 10/2007 | Mendel et al. | | 715/762 |
| 2007/0282788 A1* | 12/2007 | Lamb | G06Q 10/10 | |
| 2009/0328169 A1* | 12/2009 | Hutchison | G06F 21/41 | 726/7 |

FOREIGN PATENT DOCUMENTS

| | | |
|---|---|---|
| JP | 2002-278681 A | 9/2002 |
| JP | 2002-278683 A | 9/2002 |
| JP | 2003-536138 A | 12/2003 |
| JP | 2004-171229 A | 6/2004 |
| JP | 2004213366 | 7/2004 |
| JP | 2004-246647 A | 9/2004 |
| JP | 2005063428 | 3/2005 |
| JP | 2005-100079 | 4/2005 |
| JP | 2005-327260 | 11/2005 |
| JP | 2007-183916 | 7/2007 |
| JP | 2008-077634 | 4/2008 |

OTHER PUBLICATIONS

Ross McKillop, How to keep any Windows program "always on top", Apr. 9, 2008.*
RoboForm User Manual (Print Version), Copyright Siber Systems 2000-2007.http://www.roboform.com/manual-pr.html.*
Database Keys by Mike Chapple, retrived via archive.org, May 13, 2008 http://databases.about.com/od/specificproducts/a/keys.htm.*
Orgera, "Ways to Quickly Close Your Browser", About.com Dec. 20, 2007, 1 pg. https://web.archive.org/web/20071220181526/http://browsers.about.com/od/fire3/a/closebrowser.htm.*
Tschabitscher, Heinz, How to Clear Private Data, Empty Caches and Remove Cookies in Mozilla Firefox, http://email.about.com/od/staysecureandprivate/qt/et_clear_ff.htm; Nov. 2013

* cited by examiner

| LABEL INFORMATION TABLE 25 | |
|---|---|
| LABEL NAME | ID |
| | |
| | |
| | |
| | |
| | |
| | |
| | |
| | |

| INPUT INFORMATION TABLE 26 | |
|---|---|
| ID | INPUT INFORMATION |
| | |
| | |
| | |
| | |
| | |
| | |
| | |
| | |

| LABEL INFORMATION TABLE 25 | |
|---|---|
| LABEL NAME | ID |
| DATE | 1001 |
| STARTING PLACE | 1002 |
| ARRIVAL PLACE | 1003 |
| | |
| | |
| | |
| | |
| | |

| INPUT INFORMATION TABLE 26 | |
|---|---|
| ID | INPUT INFORMATION |
| | |
| | |
| | |
| | |
| | |
| | |
| | |
| | |

```
<HTML>
<HEAD>
<TITLE>WEB PAGE OF A INC. </TITLE>
</HEAD>
<BODY>
<DIV style="top ; 143px; left ; 85px;
" id="Layer1"><FONT size="+1"><B>STARTING PLACE</B><FONT></DIV>
<DIV style="top ; 79px; left ; 92px;
" id="Layer2"><FONT size="+1"><B>DATE</B></FONT></DIV>
<DIV style="top ; 143px; left ; 371px;
" id="Layer3"><FONT size="+1"><B>ARRIVAL PLACE</B><FONT></DIV>
<DIV style="top ; 79px; left ; 174px;
" id="Layer4">
<FORM><INPUT size="20" type="text" maxlength="10" name="startDate">
</FORM>
</DIV>
<DIV style="top ; 143px; left ; 175px;
" id="Layer5">
<FORM><INPUT size="20" type="text" maxlength="20" name="startPlace">
</FORM>
</DIV>
<DIV style="top ; 143px; left ; 476px;
" id="Layer6">
<FORM><INPUT size="20" type="text" maxlength="20" name="goalPlace">
</FORM>
</DIV>
</BODY>
</HTML>
```

*Fig. 4*

LABEL INFORMATION TABLE 25

| LABEL NAME | ID |
|---|---|
| DATE | 1001 |
| STARTING PLACE | 1002 |
| ARRIVAL PLACE | 1003 |
| | |
| | |
| | |
| | |
| | |

INPUT INFORMATION TABLE 26

| ID | INPUT INFORMATION |
|---|---|
| 1001 | 10/20/2007 |
| | |
| | |
| | |
| | |
| | |
| | |
| | |

LABEL INFORMATION TABLE 25

| LABEL NAME | ID |
|---|---|
| DATE | 1001 |
| STARTING PLACE | 1002 |
| ARRIVAL PLACE | 1003 |
| | |
| | |
| | |
| | |
| | |

INPUT INFORMATION TABLE 26

| ID | INPUT INFORMATION |
|---|---|
| 1001 | 10/20/2007 |
| 1002 | MACHIDA |
| 1003 | OSAKA |
| | |
| | |
| | |
| | |
| | |

| LABEL INFORMATION TABLE 25 ||
| LABEL NAME | ID |
| DATE | 1001 |
| STARTING PLACE | 1002 |
| ARRIVAL PLACE | 1003 |
|  |  |
|  |  |
|  |  |
|  |  |
|  |  |

| INPUT INFORMATION TABLE 26 ||
| ID | INPUT INFORMATION |
| 1001 | 10/20/2007 |
| 1002 | MACHIDA |
| 1003 | OSAKA |
| 1002 | CHUORINKAN |
| 1003 | SAPPORO |
|  |  |
|  |  |
|  |  |

| LABEL INFORMATION TABLE 25 | |
|---|---|
| LABEL NAME | ID |
| DATE | 1001 |
| STARTING PLACE | 1002 |
| ARRIVAL PLACE | 1003 |
| DESTINATION | 1003 |
| | |
| | |
| | |
| | |

| INPUT INFORMATION TABLE 26 | |
|---|---|
| ID | INPUT INFORMATION |
| 1001 | 10/20/2007 |
| 1002 | MACHIDA |
| 1003 | OSAKA |
| 1002 | CHUORINKAN |
| 1003 | SAPPORO |
| | |
| | |
| | |

SYNONYM TABLE 22

| LABEL NAME | SYNONYM ID |
|---|---|
| DATE | 1001 |
| START DATE | 1001 |
| STARTING PLACE | 1002 |
| DEPARTURE STATION | 1002 |
| ARRIVAL PLACE | 1003 |
| DESTINATION | 1003 |
| EXIT STATION | 1003 |
| ROUTE | 1004 |

| LABEL INFORMATION TABLE 25 ||
|---|---|
| LABEL NAME | ID |
| DATE | 1001 |
| STARTING PLACE | 1002 |
| ARRIVAL PLACE | 1003 |
| DESTINATION | 1003 |
| ROUTE | 1004 |
|  |  |
|  |  |
|  |  |

| INPUT INFORMATION TABLE 26 ||
|---|---|
| ID | INPUT INFORMATION |
| 1001 | 10/20/2007 |
| 1002 | MACHIDA |
| 1003 | OSAKA |
| 1002 | CHUORINKAN |
| 1003 | SAPPORO |
|  |  |
|  |  |
|  |  |

| LABEL INFORMATION TABLE 25 ||
| --- | --- |
| LABEL NAME | ID |
| DATE | 1001 |
| STARTING PLACE | 1002 |
| ARRIVAL PLACE | 1003 |
| DESTINATION | 1003 |
| ROUTE | 1004 |
|  |  |
|  |  |
|  |  |

| INPUT INFORMATION TABLE 26 ||
| --- | --- |
| ID | INPUT INFORMATION |
| 1001 | 10/20/2007 |
| 1002 | MACHIDA |
| 1003 | OSAKA |
| 1002 | CHUORINKAN |
| 1003 | SAPPORO |
| 1004 | MACHIDA |
|  |  |
|  |  |

INPUTTING DATA TO A WEB PAGE

BACKGROUND

In the modern world, the Internet and its galaxy of web sites can be searched for target information on a daily basis. Consider the case of making a reservation for a trip or checking how to get to a particular destination by way of example. In the case of making travel plans, a user may visits the web sites of a number of travel agencies, one by one, to get travel information. The user may also compare the results from a number of web pages posting travel information with respect to a desired travel itinerary or to compare prices. In addition, the user often searches for a particular route to a destination or checks the weather after searching for the destination or accommodations.

Searching a limited set of parameters on a number of web sites in this way can be burdensome. At each new web site consulted, the user may have to re-enter the same parameters over and over again. Some problems would occur in such a case that a user compares prices, service contents, or word-of-mouth recommendations on different web pages.

BRIEF SUMMARY

A system for inputting data to a web page that is selectively accessed and displayed through a web browser executing on a computing device includes an electronic scratch pad on the computing device that is configured to identify data entry fields on an accessed web page and to retrieve a label corresponding to any identified data entry field of the web page. The electronic scratch pad records the label and any user input that is input using a user input device to the corresponding data entry field.

A method for inputting data to a web page that is selectively accessed and displayed through a web browser executing on a computing device includes, with an electronic scratch pad on the computing device, identifying data entry fields on an accessed web page and retrieving a label corresponding to any identified data entry field of the web page; and with the electronic scratch pad, recording the label and any user input that is input using a user input device to the corresponding data entry field.

A system for inputting data to a web page that is selectively accessed and displayed through a web browser executing on a computing device includes a physical computer-readable medium storing instructions for an electronic scratch pad that is configured to; identify data entry fields on a web page accessed by the web browser and to retrieve a label corresponding to any identified data entry field of the web page, and record the label and any user input that is input using a user input device to the corresponding data entry field.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 4 shows a source code of an HTML of an A Inc. web page.

Throughout the drawings, identical reference numbers designate similar, but not necessarily identical, elements.

DETAILED DESCRIPTION

Figure 1:
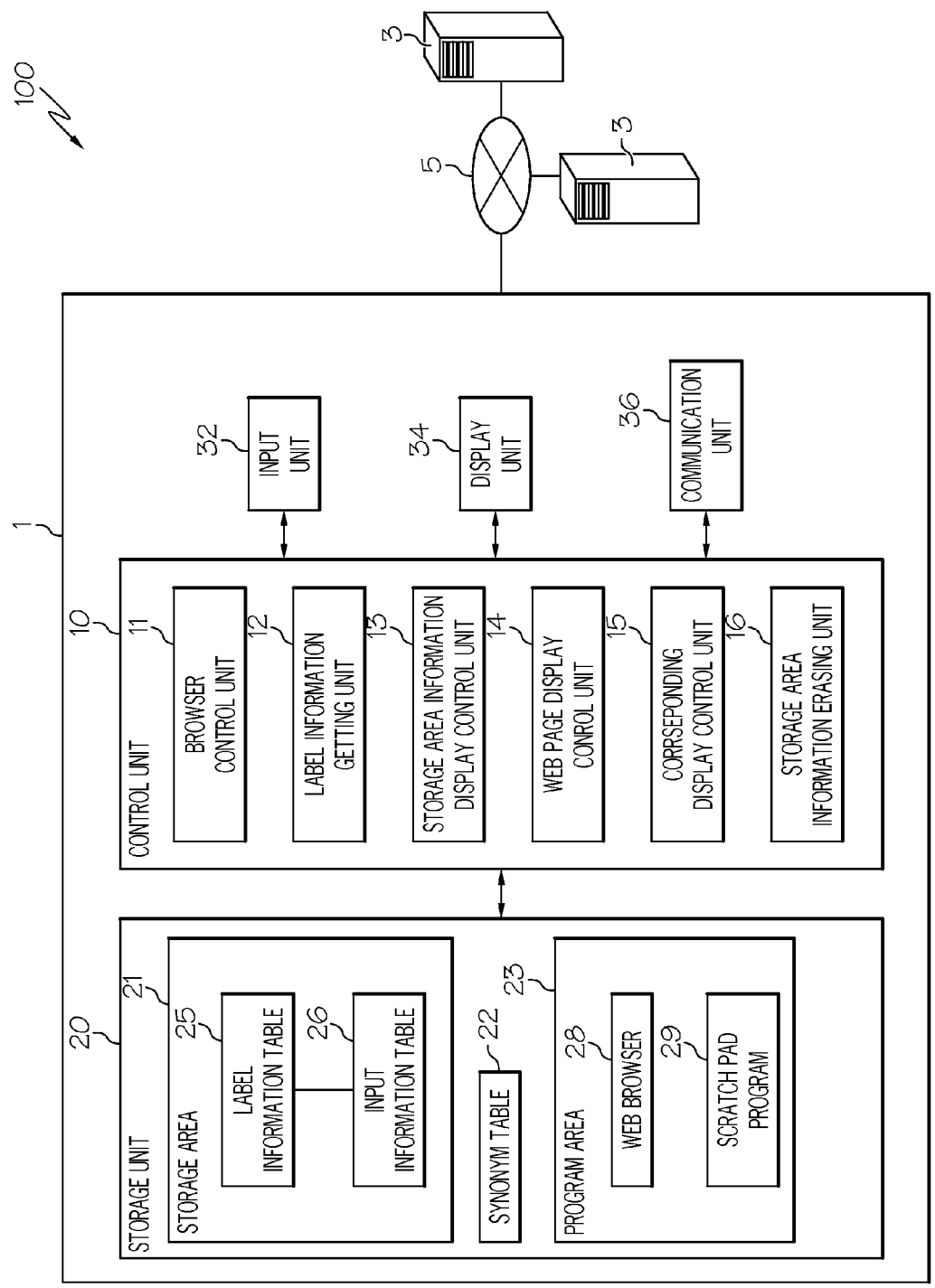
FIG. 1 shows the overall configuration of a web system and the functional configuration of a terminal corresponding to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

According to a first aspect of the present invention, in a method for input assistance to an input item on a web page, a control unit of a terminal, which activates a web browser to display the web page, gets label information corresponding to the input item on the web page. Then, the control unit of the terminal, stores the retrieved label information in a storage area of the terminal, and in response to entry to the input item, stores input information in the storage area corresponding to the label information. The information stored in the storage area is erased when the control unit closes all the web browsers. Further, in response to activation to display another web page different from the web page being displayed, with the control unit of the terminal, label information corresponding to an input item of the other web page is retrieved. Further, in response to a state that the retrieved label information corresponding to the other web page is stored in the storage area, the input information stored corresponding to the label information in the storage area is inserted into an input item corresponding to the label information of the other web page to display the other web page.

According to a second aspect of the present invention, in the method as described in the first aspect of the invention, as the control unit of the terminal determines the retrieved label information as being synonymous with label information stored in the storage area, the retrieved label information is put into the same group as the label information and stored in the storage area of the terminal.

According to a third aspect of the present invention, in the method as described in the first aspect of the invention, the control unit of the terminal displays storage area information stored in the storage area. Further, in response to an input operation regarding the displayed input information, the control unit of the terminal moves the input information to an input item on the web page corresponding to the input information to display the web page. The term "input operation regarding the displayed input information" means to select and drag and drop the input information or to double-click the input information, for example.

In addition, another embodiment of the present invention is a computer program product for causing a computer to execute steps of the above method. In addition, another embodiment of the present invention is a terminal for executing the above method.

According to aspects of the present invention, it is possible to provide a method, computer program product, and terminal for input assistance to an input item on a web page, which store input information entered to an input item on a web page together with label information corresponding to the input item in a storage area. In addition, if label information of another opened web page is stored in the storage area, the input information stored in the storage area is inserted into an input item corresponding to label information of the other web page to display the other web page. Therefore, input information entered to a web page by a user for search purposes can be used on another web page, which improves usability.

Hereinafter, aspects of the present invention will be described in detail with reference to the accompanying drawings. FIG. 1 shows the overall configuration of a web system 100 and the functional configuration of a terminal 1 according to an embodiment of the present invention. The web system 100 includes the terminal 1, a population of web servers 3, and a communication network 5. As shown in FIG. 1, the terminal 1 and the web servers 3 are connected to each other in a communicable form through the communication network 5 typified by a communication line or network such as the Internet.

The terminal 1 is a computer typified by a personal computer (PC). The terminal 1 can communicate with the communication network 5 either by a cable or wire or through a wireless communication connection. Further, the terminal 1 may be portable, for example, a laptop or notebook computer. The web server 3 is, for example, a server owned by a particular company that servers up a web site advertising or selling the goods or services of that company. The web server 3 typically stores and serves any number of web pages as part of the serviced web site.

The terminal 1 includes a control unit 10, a storage unit 20, a user input device 32, a display unit 34, and a communication unit 36. The control unit 10 includes a browser control unit 11, a label information getting unit 12, a storage area information display control unit 13, a web page display control unit 14, a correspondence display control unit 15, and a storage area information erasing unit 16.

The browser control unit 11 accepts input from the user input device 32 and activates a web browser 28 as described below. Further, as directed by the user, the browser control unit 11 accepts input from the user input device 32 and closes the web browser 28. The label information getting unit 12 gets an input label name (label information) corresponding to an input field on a web page. The input label name is positioned near the input field on a web page described in, for example, HTML (HyperText Markup Language). The input label name specifies or describes the type of data requested by that particular input field, such as date, name, etc.

The storage area information display control unit 13 controls the display unit 34 to display the information (storage area information) stored in a storage area 21 as described later. The information stored in the storage area 21 refers to label information and input information. Further, a screen displaying the information stored in the storage area 21 on the display unit 34 is referred to as "scratch pad." The scratch pad is provided for a user in a one-to-one correspondence. The web page display control unit 14 controls the display unit 34 to display a web page. The correspondence display control unit 15 defines corresponding relationships between the input label name or input field on the web page and information stored on the scratch pad. The storage area information erasing unit 16 selectively erases the information stored in the storage area 21 and releases the storage area 21.

The storage unit 20 includes the storage area 21, a synonym table 22, and a program area 23. The storage area 21 is a volatile local memory and thus not permanent. At the time of activating the web browser 28, the storage area 21 is initialized. At the time of closing the web browser 28, information in the storage area 21 may be erased. In addition, the storage area 21 stores one or more input label names from a web page, that were obtained with the control unit 10, as a label name in a label information table 25. The storage area 21 also stores input information entered in an input field corresponding to the input label name in an input information table 26, in correspondence with the label information table 25.

The synonym table 22 allows the system to recognize when different, synonymous terms are used to label input fields of different web sites, that the fields are requesting the same type of information. The synonym table 22 stores words that might be used in different label information, which are determined to be synonymous with one another and grouped accordingly.

The program area 23 stores various programs and stores at least, the web browser 28 and the scratch pad program 29. The web browser 28 is an application program for displaying a web page on the display unit 34. The scratch pad program 29 is a program stored in the storage area 21 or used for displaying the scratch pad on the display unit 34.

The control unit 10 of the terminal 1 activates the web browser 28 and executes the scratch pad program 29 stored in the storage unit 20. A web page is then displayed on the display unit 34 along with concurrent display of the scratch pad on the display unit 34. This processing of the control unit 10, which is carried out by executing the scratch pad program 29, causes the system to get label information corresponding to an input item on the web page being accessed and displayed, store the retrieved label information in the storage area 21, store input information in the storage area 21 in correspondence with the label information in response to entry by the user of input for that input item, get label information corresponding to an input item on another web page different from the web page displayed on the display unit 34 in response to activation of the other web page, and insert input information stored in correspondence with the label information in the storage area 21 into the input item corresponding to the label information of the other web page, for example. The scratch pad program 29 may be a program (plug-in) for adding functions to the web browser 28.

The user input device 32 is, for example, a mouse, a keyboard or a touch-sensitive screen, but will be defined in this specification and the following claims as any hardware device configured to accept input provided by a user. The scratch pad receives using input made through the user input device and pairs that input with data, such as a label, that has been retrieved, for example, from an current web page. The display unit 34 is, for example, a liquid crystal device (LCD) monitor. The contents of the scratch pad may be displayed on the display unit 34 for the user to see. The communication unit 36 is an interface for communicating with the web server 3 through the communication network 5.

Next, the use of the scratch pad to facilitate input to a web site is described. By way of example, this method is described in terms of assisting a user to input data for a search regarding travel. This explanation is given based on a screen example and information stored in the storage area 21. FIGS. 2 to 5 show a specific example of displaying a web page of a certain travel search web site referred to as A Inc.

FIG. 2(a) shows an example of a displayed screen in the case where an A Inc. web page 50 is displayed on the display unit 34 of the terminal 1 after the web browser is activated. The display unit 34 displays the scratch pad 60 as well as the A Inc. web page 50. The A Inc. web page 50 is a travel search web site including an input label name 51 for date, an input field 52 for the date, an input label name 53 for starting place, an input field 54 for starting place, an input label name 55 for arrival place, and an input field 56 for arrival place. As shown in FIG. 2(a), a user can enter search parameters to the input fields 52, 54, and 56. When a user enters search parameters to the input fields 52, 54, and 56 with the user input device 32, travel plan information that fits the search parameters is displayed in, for example, a lower portion of the A Inc. web page 50 or on another screen or page. As explained herein, this data received from the user input device 32 will also be received by the scratch pad 60.

Figure 2:
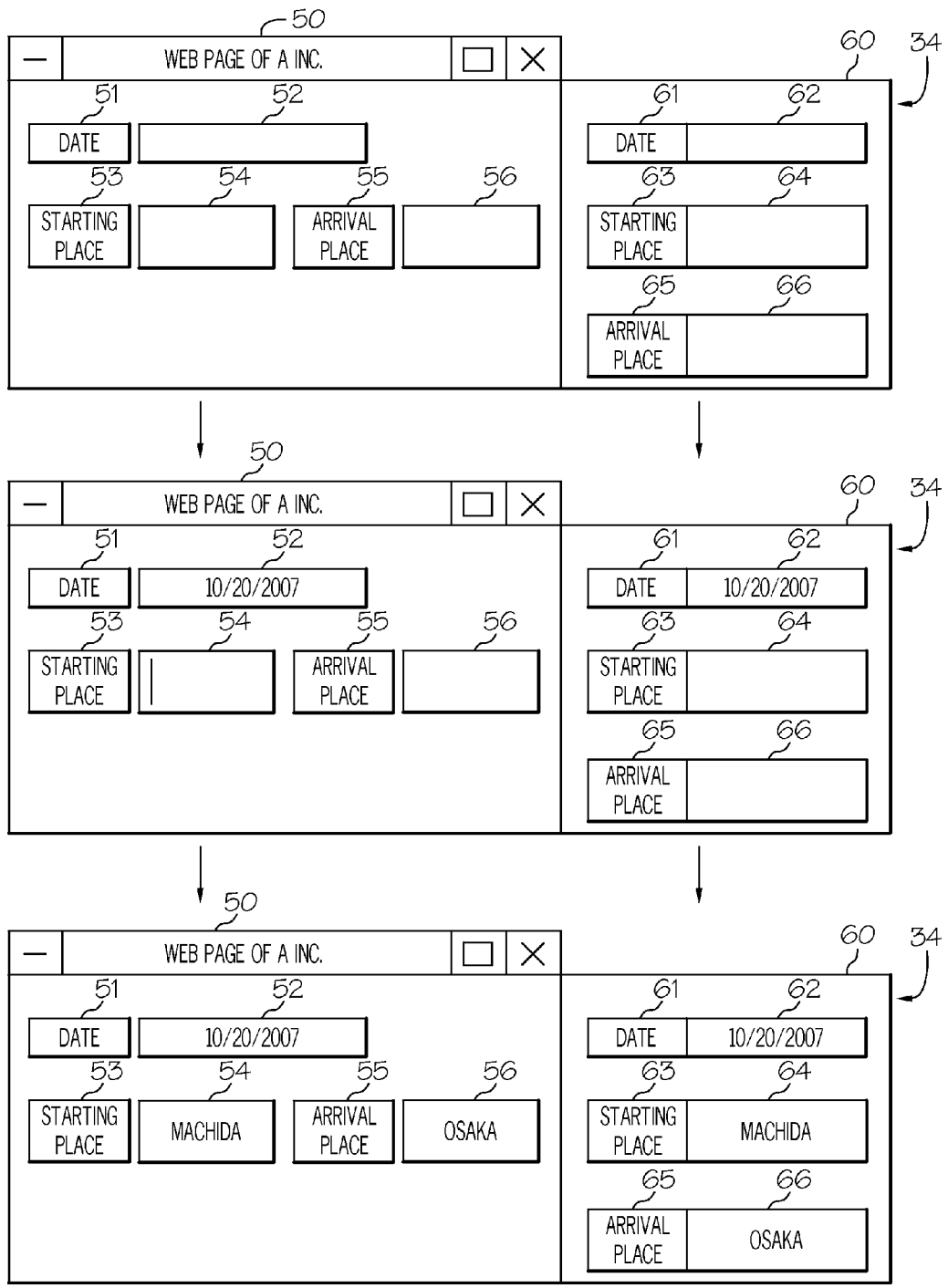
FIG. 2 shows an example of a displayed screen of an A Inc. web page.

Further, the scratch pad 60 displayed on the right of the A Inc. web page 50 includes entry field labels 61, 63, and 65 for date, starting place, and arrival place, and information portions 62, 64, and 66 corresponding to the entry field portions. The entry field labels 61, 63, and 65 each indicate an input label name of the A Inc. web page 50 stored in the storage area 21, and the information portions 62, 64, and 66 each indicate input information (search parameters) of an input field stored in the storage area 21. In the example of FIG. 2, the scratch pad 60 is displayed next to the A Inc. web page 50 on its right side but may be displayed at any position relative to the A Inc. web page 50.

Figure 3:
FIG. 3 shows a label information table and an input information table in a storage area.
Figure 5:
FIG. 5 shows a label information table and an input information table of a storage area.

FIG. 3 shows the label information table 25 and the input information table 26 stored in the storage area 21 in the storage unit 20. Initialization of the tables may be executed after activating the web browser 28, in which case, no information is stored in the label information table 25 (blank) (upper portion, FIG. 3). The, along with displaying the A Inc. web page 50 on the display unit 34 as shown in FIG. 2(a), the label names of date, starting place, and arrival place are extracted from the web page and stored in the label information table 25 (lower portion, FIG. 3). An identifier, for example a four digit number, associated with each label is stored in an identification (identifier) column in the label information table 25. Such an identifier may also be used to designated related or corresponding labels in the synonym table 22.

Further, in the case of activating the web browser to display the A Inc. web page 50, before any information is input into the fields of the web page, the input information table 26 in the storage area 21 is empty. Thus, no information is stored in information portions 62, 64, and 66 of the scratch pad 60 (blank) as shown in FIG. 2(a). Moreover, the input label names 51, 53, and 55 of date, starting place, arrival place are retrieved as an input label names of the A Inc. web page 50 and are used to label the entry field portions 61, 63, and 65 of the scratch pad 60.

Referring to FIG. 4, how to get an input label name and an input field is described. FIG. 4 shows an HTML source code of the A Inc. web page 50 of FIG. 2(a) in brief. The input field is described within tags of <FORM> and </FORM> (#1 to #3). Information input to the input field is obtained based on "name=" in INPUT tag described in tags of <FORM> and </FORM>. Thus, a character string following "name=" can be extracted as a name of the input field.

Further, portions enclosed by tags (#4) out of character strings in tags of <BODY> and </BODY> can be extracted as candidates for the input label name. However, if rendering engine is used, target information can be retrieved in shorter time. According to this method, an input label name is extracted from data described near an input field name on the web page. For example, in FIG. 2(a), the input label name 51 (date) and the input field 52 (date) are displayed in the same position in the vertical direction of the A Inc. web page 50 (#5 and #6), and the input field 52 is displayed on the right of the input label name 51 (#7 and #8).

An input label name is extracted based on the fact that input label name and the input field are displayed close to each other as a rule of thumb for the description of the web page. Therefore, label information can be retrieved in a simple manner based on the rule of thumb for the description of the web page, and the label information can be associated with the input item. In the example of FIG. 4, the input field is a text box. However, if the input field is a pull-down list or the like, target information can be retrieved in a similar way.

Referring back to FIG. 2, a detailed description will be given. FIG. 2(b) shows a process of user input of search conditions to the A Inc. web page 50. A user enters date information as a search parameter in the input field 52 (date) on the Inc. web page 50. In this case, for example, in response to movement of a cursor on the A Inc. web page 50 from the input field 52 to the input field 54, information input to the input field 52 is stored in the input information table 26 in the storage area 21 and displayed in a corresponding information portion of the scratch pad 60. In FIG. 2(b), a cursor is positioned in the input field 54 for starting place, so "Oct. 20, 2007" as information input to the input field 52 (date) is automatically displayed in the information portion 62 of the scratch pad 60. At this time, as illustrated in an upper portion of FIG. 5, information input to the A Inc. web page 50 is stored in the input information table 26, which corresponds to a label name "date" in the label information table 25.

As shown in FIG. 2(c), in the case of inputting search conditions to the input fields 52, 54, and 56 of the A Inc. web page 50, information input to the input fields 52, 54, and 56 is displayed in the information portions 62, 64, and 66, corresponding to the input fields 52, 54, and 56. Further, as shown in a lower portion of FIG. 5, input information is stored in the input information table 26 in correspondence with a label name based on an identifier.

As described above, information input to the input field can be automatically stored in the storage area 21 together with the input label name corresponding to the input field, which omits a pre-storing process and other such settings. Further, information stored in the storage area 21 can be displayed on the scratch pad 60.

Referring to FIG. 6, a description is made of a specific example of additionally using the information used for search on the A Inc. web page 50.

Figures 6A, 6B:
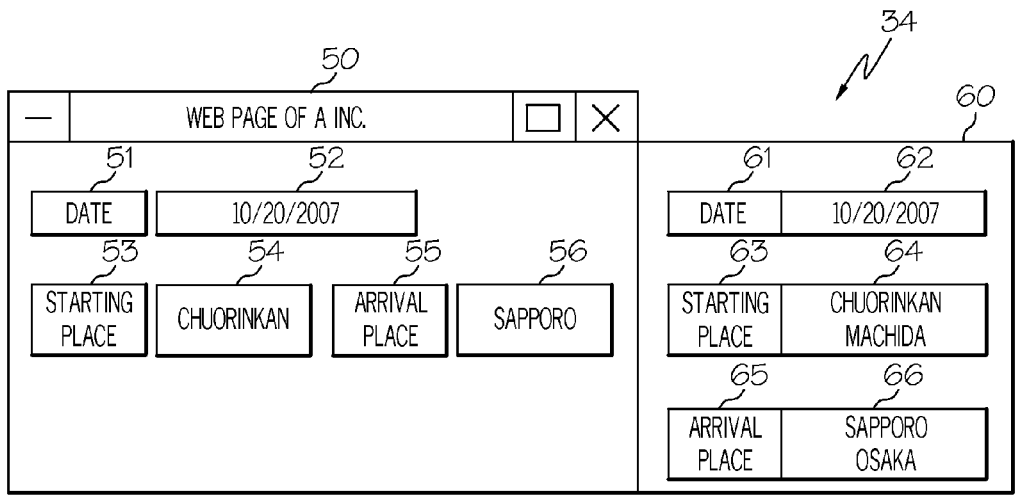
FIGS. 6a-6b shows a specific example of displaying an A Inc. web page.

FIG. 6(a) shows an example where a starting place and an arrival place on the A Inc. web page 50 are changed on the screen of FIG. 2(c). When information input by a user with the user input device 32 is stored in the input field 54 (starting place) and the input field 56 (arrival place), the information which was input to the A Inc. web page 50 is additionally stored in the input information table 26 of the storage area 21 of FIG. 6(b). In this case, "Chuorinkan" is stored as input information corresponding to the label name of starting place, and "Sapporo" is stored as input information corresponding to the label name of arrival place in the input information table 26. Further, "Chuorinkan" and "Sapporo" are displayed in the information portion 64 and the information portion 66 above the information portion on the scratch pad 60 of FIG. 6(a), respectively.

As described above, the latest input information is displayed above the information portion to help a user in checking the latest input information.

Next, a specific example of the jump to a web page on another travel search web site is described with reference to FIGS. 7 to 9.

Figures 7A, 7B:
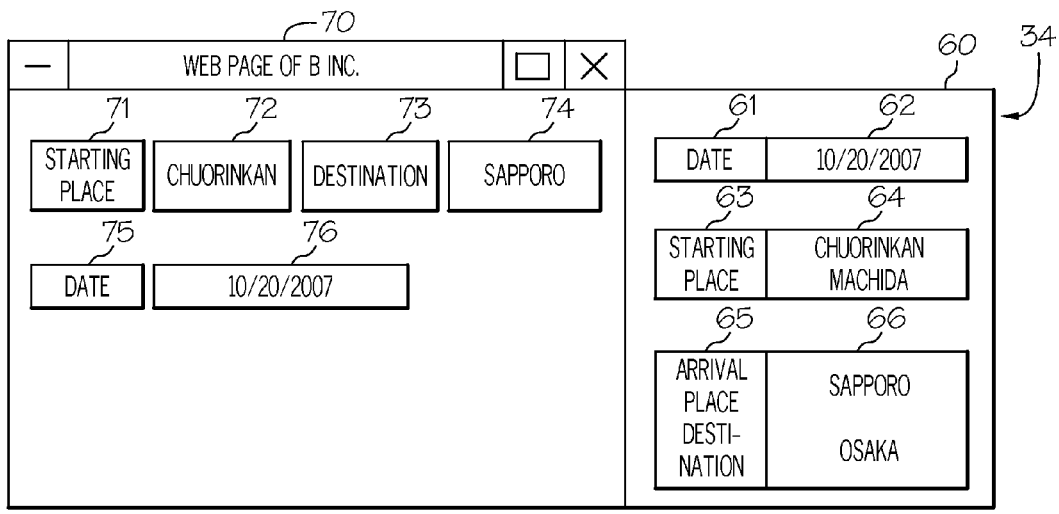
FIGS. 7a-7b shows a specific example of displaying a B Inc. web page.

FIG. 7(a) shows an exemplary screen on which a B Inc. web page 70, the web page of another travel search web site, is displayed on the display unit 34. Considering that a user jumps from the A Inc. web page 50 of FIG. 6(a) to the B Inc. web page 70, it is determined whether the label name of the label information table 25 of the storage area 21 of FIG. 6(b) matches the input label name of B Inc. web page 70. If matched, the latest one of the input information corresponding to the label name of the label information table 25 is stored in an input field corresponding to the input label name of the B Inc. web page 70.

In FIG. 7(a), the label name "date" of the label information table 25 matches the input label name 75 (date) of the B Inc. web page 70. Thus, "Oct. 20, 2007" in the input information table 26 corresponding to the label name "date" of the label information table 25 is stored in the input field 76 corresponding to the input label name 75. Likewise, the latest one of information (in this example, "Chuorinkan") in the input information table 26 corresponding to the label name "starting place" of the label information table 25 is stored in the input field 72 corresponding to the input label name 71 (starting place).

On the other hand, a label name of the label information table 25 corresponding to the input label name 73 (destination) of the B Inc. web page 70 is not stored (see FIG. 6(b)). In this case, the synonym table 22 stored in storage unit 20 of FIG. 8 is referenced to check grouped information. Referring to the synonym table 22, the label name "destination" corresponds to synonym identifier "1003". In addition, "arrival place" and "exit station" are found as a result of searching the synonym table 22 for the synonym identifer "1003". Here, the label name "arrival place" is stored as the label name in label information table 25, so "destination" is added to the label name of the label information table 25. At this time, if this information is given the same identifier as the label name (arrival place), the arrival place and the destination can be put into the same group.

Further, the latest one of information (in this example, "Sapporo") in the input information table 26 corresponding to the label name "arrival place" or "destination" of the label information table 25 is stored in the input field 74 corresponding to the input label name 73 (destination) of the B Inc. web page 70. In addition, as illustrated in the scratch pad 60 of FIG. 7(a), the scratch pad 60 is updated and displayed based on the information stored in the storage area 21. To be specific, the entry field portion 65 is set to "arrival place, destination".

As described above, if the input label name of another web page matches with the label name of the entry field portion displayed on the scratch pad 60 upon jumping to the other web page, the latest information is automatically input to the input field corresponding to the input label name, which saves input processing for search. In particular, this feature is effective for the case of searching plural web pages under the same conditions. In addition, although the input label name of another web page does not match with the label name of the entry field portion displayed on the scratch pad 60, if the label name matches with the label names grouped in the synonym table 22, the latest information is similarly automatically input to the input field corresponding to the input label name, which improves usability and saves input processing for search. The label name varies among companies in many cases. In such cases, however, the synonym table is used to save input processing.

Figures 8, 9:
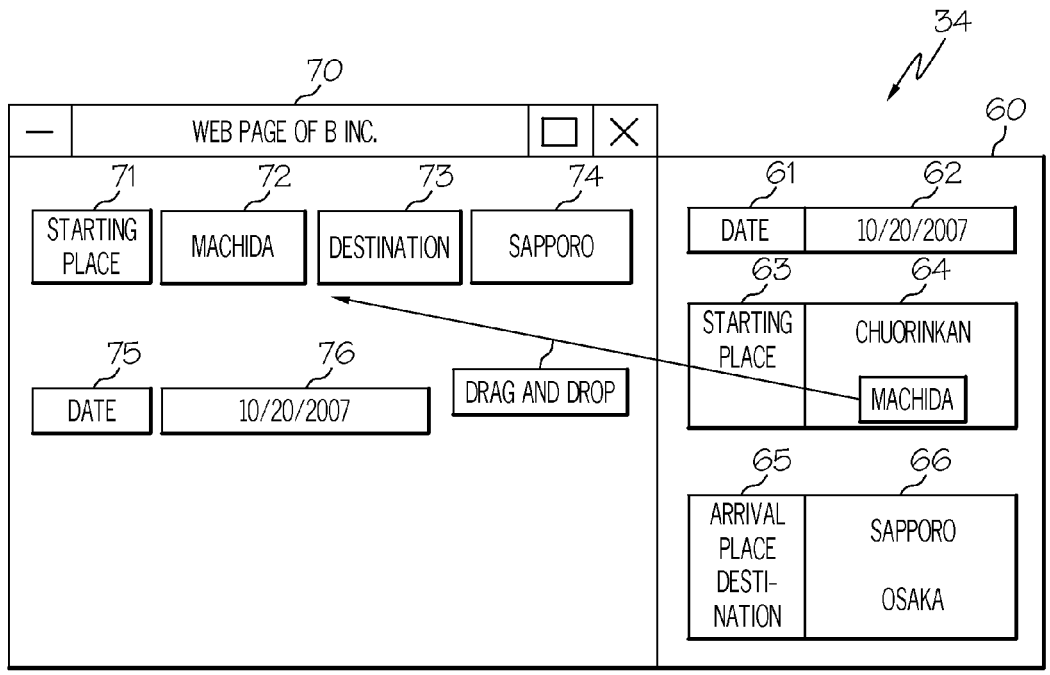
FIG. 8 shows a synonym table.
FIG. 9 shows a specific example of displaying a B Inc. web page.

FIG. 9 shows an exemplary screen where a value of the input field 72 (starting place) on the B Inc. web page 70 is changed using a value displayed on the scratch pad 60. In the case, where a value of the input field 72 on the B Inc. web page 70 is changed from "Chuorinkan" to "Machida" displayed in the information portion 64 corresponding to the entry field portion 63 (starting place) of the scratch pad 60, a user selects "Machida" displayed in the information portion 64 of the scratch pad 34, and drags and drops "Machida" to the input field 72 of the web page with a mouse as the user input device 32. As a result, the value in the input field 72 can be changed from "Chuorinkan" to "Machida," without the user having to re-type the name "Machida."

As described above, if a user wants to replace a part of the information automatically input at the time of opening the web page by other information, more specifically, replace the information by information displayed on the scratch pad 60, search conditions can be easily changed by dragging and dropping predetermined information from the scratch pad 60 to the date entry fields of the web page. In this example, the information is replaced through drag and drop but user input data from the scratch pad 60 may also be selected with a double-click or other means.

Referring to FIGS. 10 and 11, a specific example of the jump to a web page of still another travel search web site is described.

Figures 10A, 10B:
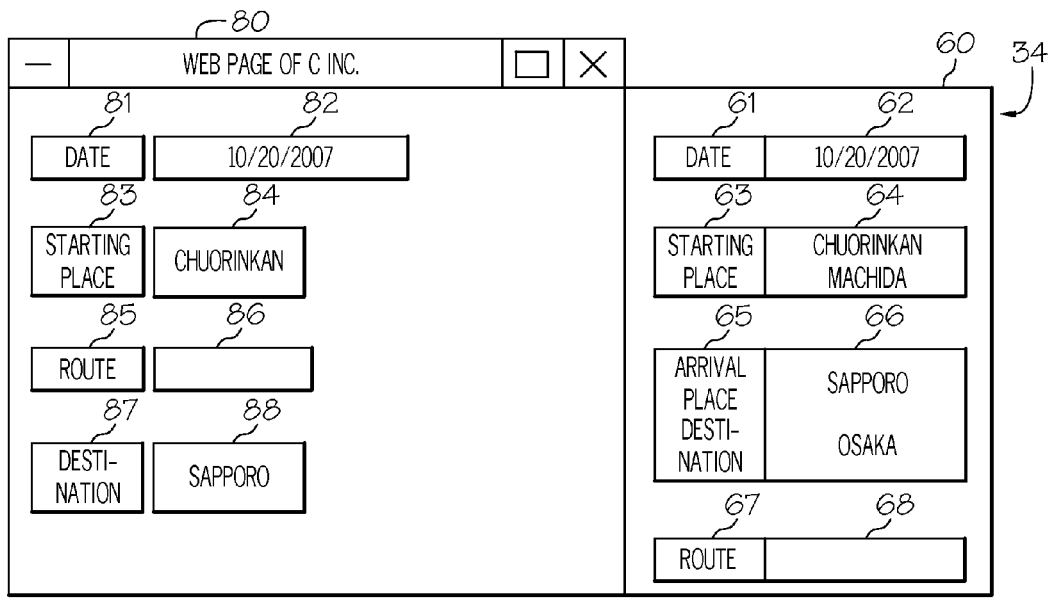
FIGS. 10a-10b shows a specific example of displaying a C Inc. web page.

FIG. 10(a) shows an exemplar screen where a C Inc. web page 80, as a web page of still another travel search web site is displayed on the display unit 34. When a user jumps to the C Inc. web page 80, it is determined whether a label name of the label information table 25 of the storage area 21 as shown in FIG. 7(b), which is displayed just before the jump to the C Inc. web page 80, matches with an input label name on the C Inc. web page 80. If matched, the latest one of the input information corresponding to the label name of the label information table 25 is stored in an input field corresponding to the input label name on the C Inc. web page 80. In FIG. 10(a), since the label name "date" of the label information table 25 matches with the input label name 81 (date) on the C Inc. web page 80, "Oct. 20, 2007" in the input information table 26 corresponding to the label name "date" of the label information table 25 is stored in the input field 82 corresponding to the input label name 81.

Likewise, the latest one of information in the input information table 26 corresponding to the label name "starting place" in the label information table 25 (in this example, "Chuorinkan") is stored in the input field 84 corresponding to the input label name 83 (starting place). Further, the latest one of information in the input information table 26 corresponding to the label name "destination" in the label information table 25 (in this example, "Sapporo") is stored in the input field 88 corresponding to the input label name 87 (destination).

In this example, a label name corresponding to the input label name 85 (route) on the C Inc. web page 80 is not set in the label information table 25 of the storage area 21. Further, a label name synonymous with "route" cannot be found in the label information table 25 even with reference to the synonym table 22. If a corresponding input label name of the C Inc. web page 80 is not found in the label information table 25 as above, as shown in FIG. 10(b), a label name "route" is added to the label information table 25. Then, the entry field portion 67 for route is displayed on the scratch pad 60, and no information is stored in the information portion 68 (blank) corresponding to the entry field portion 67.

Figures 11A, 11B:
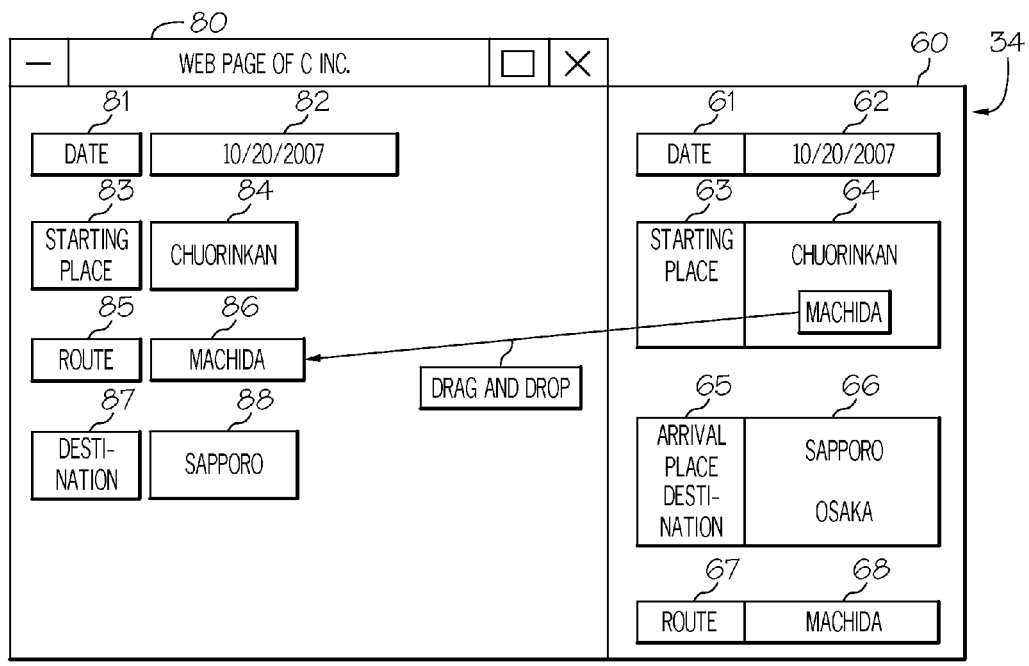
FIGS. 11a-11b shows a specific example of displaying a web page.

FIG. 11(a) shows the case where information is input to the input field 86 corresponding to the input label name 85 (route). In the case of using information displayed in the scratch pad 60, the information can be easily input by a user selecting and dragging-and-dropping already entered search parameters. FIG. 11(b) shows the storage area 21 after the information is input to the input field 86 (route). An identifier similar to an identifier of the stopover place in the label information table 25 is added to the input information table 26, and "Machida" is stored. In this example as well, information displayed in the scratch pad 60 is dragged and dropped, but the present invention is not limited thereto. Desired information may be directly input with a keyboard etc.

Figure 12A:
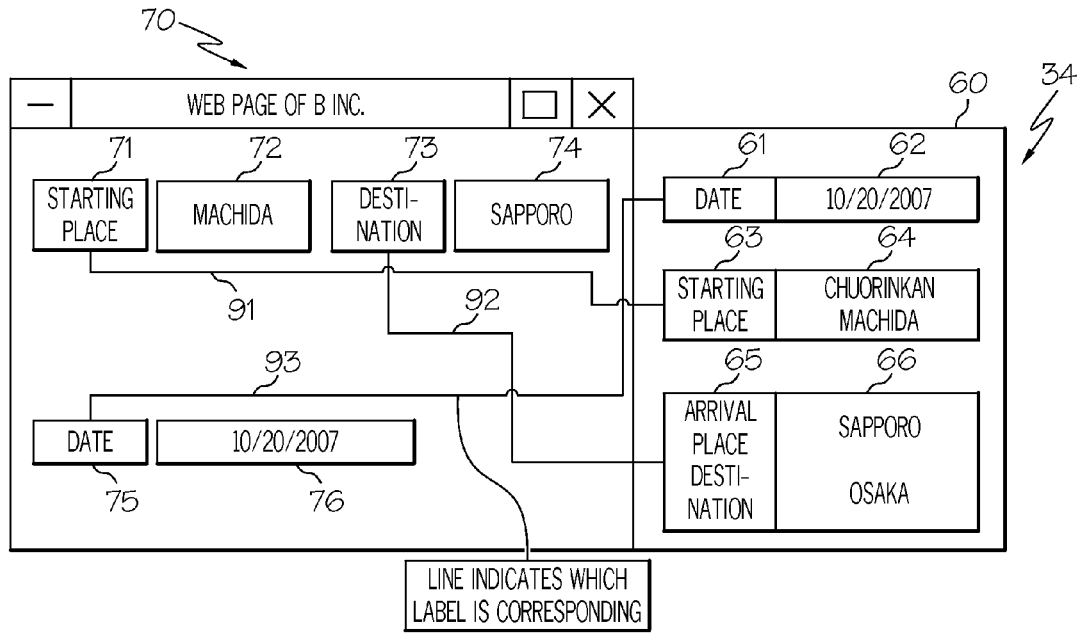
FIGS. 12a-12b shows a display example of correspondence.
Figure 12B:
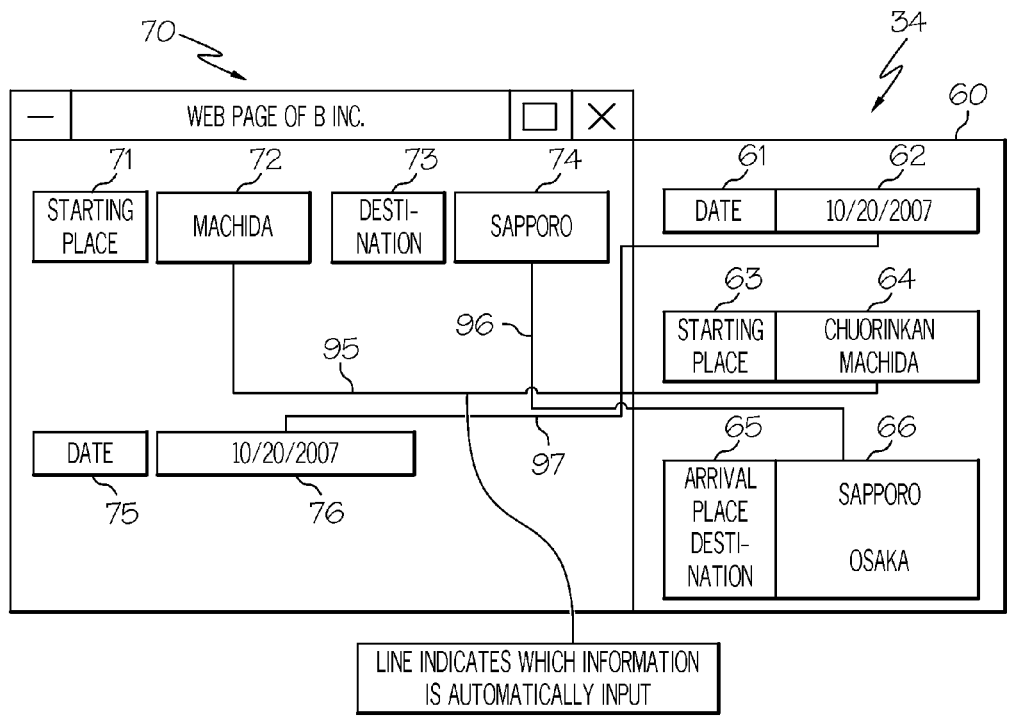

Referring to FIG. 12, a specific example of how to display correspondence is described. FIG. 12 shows an example where correspondence between the B Inc. web page 70, as an example of the web page, and the scratch pad 60 is illustrated with lines in an easy-to-understand manner. FIG. 12(a) shows label correspondence, and FIG. 12(b) shows input field correspondence.

FIG. 12(a) shows the B Inc. web page 70 and the scratch pad 60 with a line 91 connecting the input label name 71 (starting place) and the entry field portion 63 corresponding to the input label name 7, a line 92 connecting the input label name 73 (destination) and the entry field portion 65 corresponding to the input label name 73, and a line 93 connecting the input label name 75 (date) and the entry field portion 61 corresponding to the input label name 75.

FIG. 12(b) shows the B Inc. web page 70 and the scratch pad 60 with a line 95 connecting the input field 72 (starting place) and the information portion 64 corresponding to the input field 72, a line 96 connecting the input field 74 (destination) and the information portion 66 corresponding to the input field 74, and a line 97 connecting the input field 76 (date) and the information portion 62 corresponding to the input field 76.

In either case, the correspondence is indicated with the lines in a user-recognizable manner. Consequently, a user can easily check which label is associated or which information is automatically input.

Figure 13:
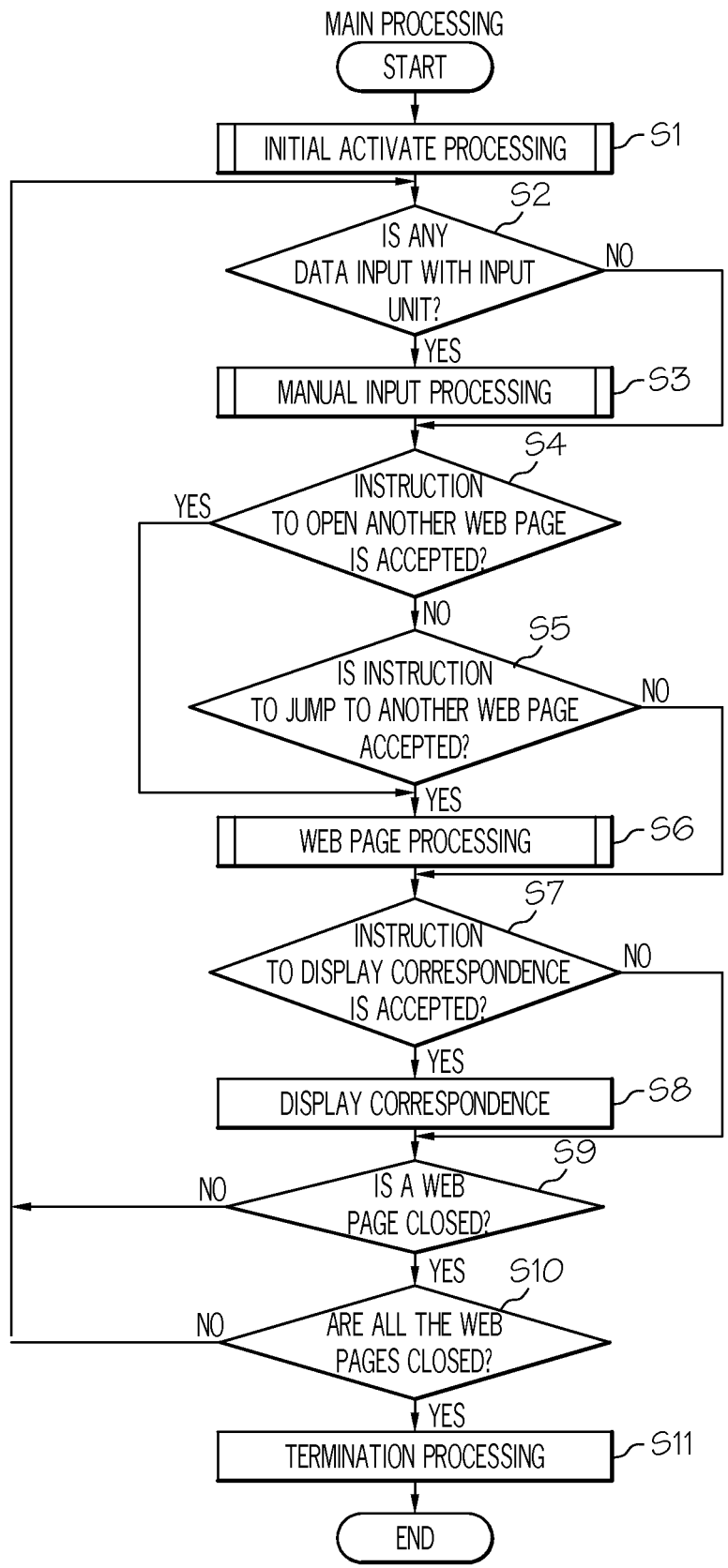
FIG. 13 is a flowchart of main processing.
Figure 14:
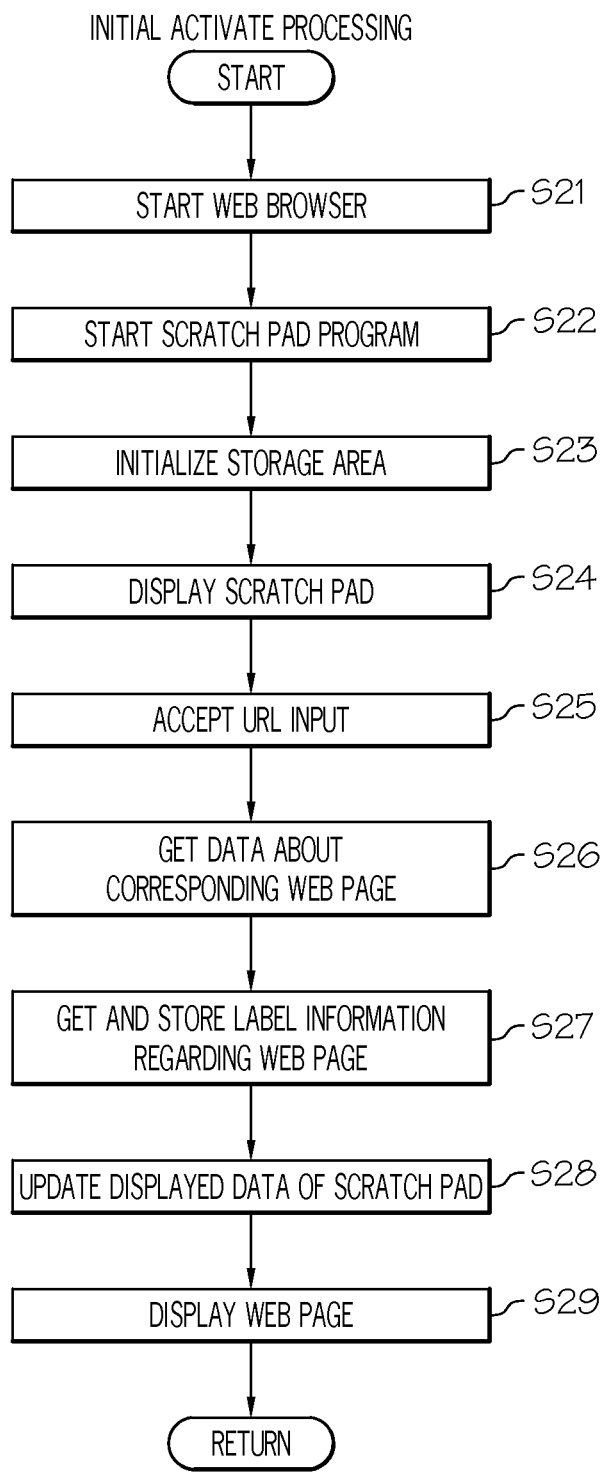
FIG. 14 is a flowchart of initial activate processing.
Figure 15:
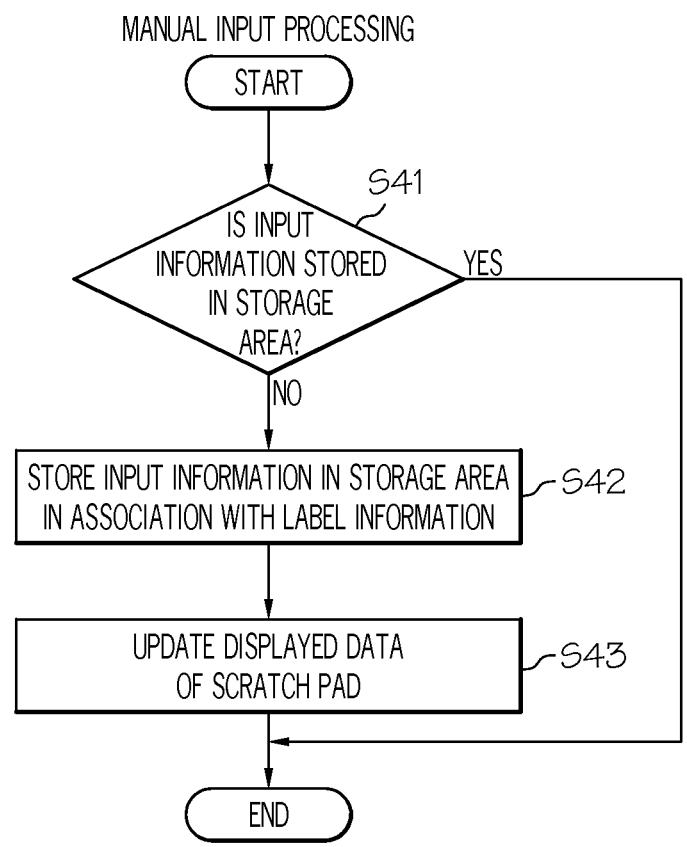
FIG. 15 is a flowchart of manual input processing.
Figure 16:
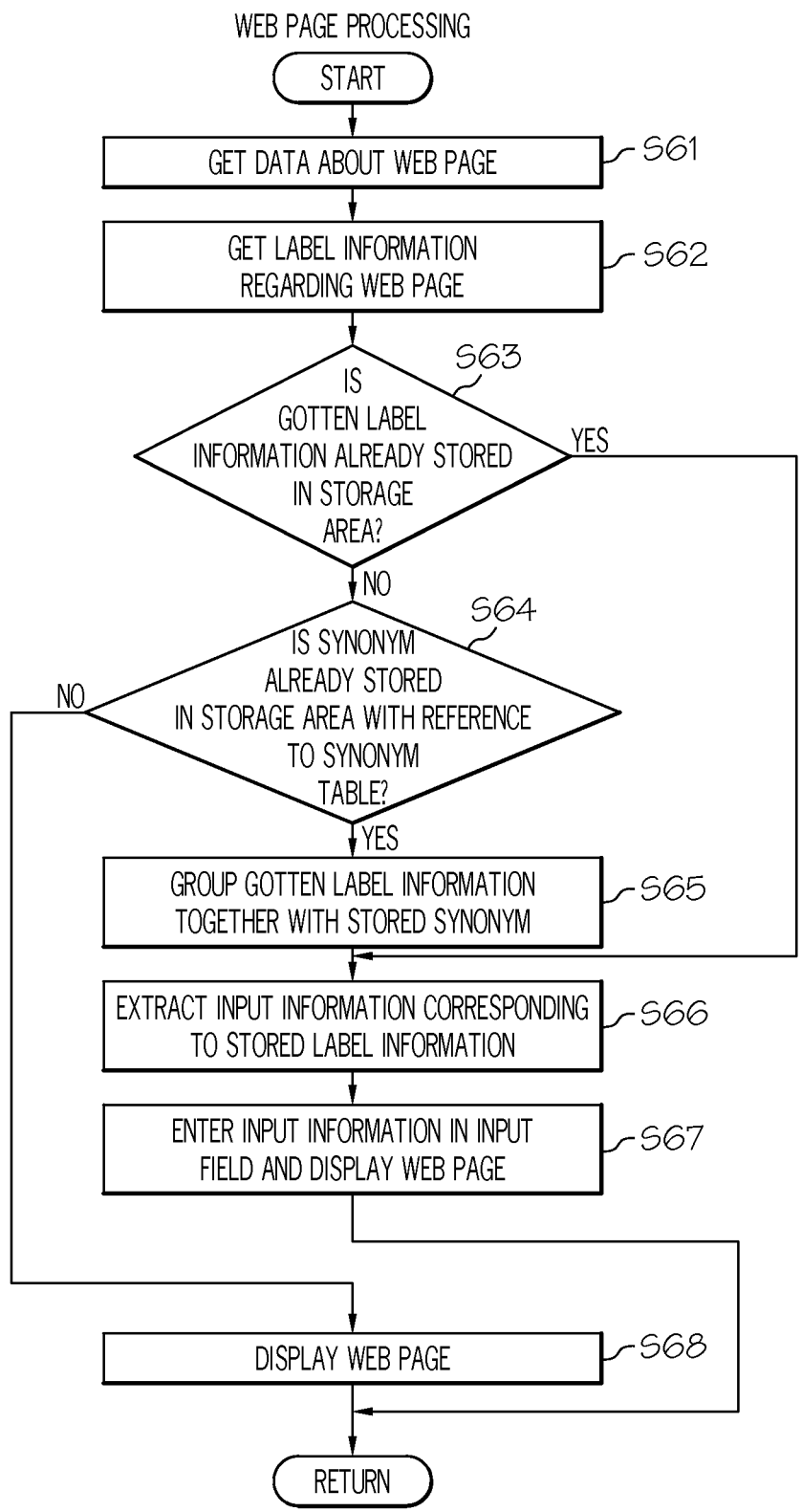
FIG. 16 is a flowchart of web page processing.

Next, a description is given of the input assistance processing utilizing the scratch pad 60 as specifically described above, with reference to FIG. 13 to FIG. 16. FIG. 13 is a flowchart of main processing. FIG. 14 is a flowchart of initial processing. FIG. 15 is a flowchart of manual input processing. FIG. 16 is a flowchart of web page processing.

First, in step S1 of FIG. 13, the control unit 10 performs initial start processing of FIG. 14.

Referring to FIG. 14, initial start processing is described. In step S21 of FIG. 14, the browser control unit 11 activates the web browser 28 stored in the program area 23 of the storage unit 20 in correspondence with an instruction from the user input device 32. Next, in step S22, the control unit 10 initiates the scratch pad program 29 stored in the program area 23 of the storage unit 20. In step S23, the control unit 10 initializes the storage area 21. After the completion of initialization, the storage area 21 stores no information (blank).

Next, in step S24, the storage area information display control unit 13 displays the scratch pad 60 on the display unit 34. At this point, only a screen (frame) is displayed in the scratch pad 60. In step S25, the control unit 10 accepts address information (URL) of a web page from the user input device 32. As a result, the control unit 10 gets a target web page in step S26.

In step S27, the label information acquisition unit 12 gets label information of the accessed web page and stores the information in the storage area 21. In step S28, the storage area information display control unit 13 updates and displays the scratch pad 60 on the display unit 34. In this example, a label name is displayed in an entry field portion of the scratch pad 60. In step S29, the web page display control unit 14 displays the web page on the display unit 34. After that, the control unit 10 returns to the main processing.

Referring back to FIG. 13, in step S2, the control unit 10 subsequently determines whether input to an input field from the user input device 32 is accepted. If input is accepted (step S2: YES), the control unit 10 advances the processing to step S3 and performs manual input processing of FIG. 15. On the other hand, if input is not accepted (step S2: NO), the control unit 10 advances the processing to step S4.

Referring now to FIG. 15, manual input processing is described. In step S41 of FIG. 15, the control unit 10 determines whether information entered to the input field is stored in the storage area 21. If already stored in the storage area 21 (step S41: YES), the control unit 10 terminates this processing and returns to the main processing. On the other hand, if not stored in the storage area 21 (step S41: NO), the control unit 10 advances the processing to step S42.

In step S42, the control unit 10 stores input information in association with a corresponding label name in the storage area 21. To be specific, at the time of inputting information as shown in FIG. 2(b), the information is stored in the input information table 26 of the storage area 21 as illustrated in an upper portion of FIG. 5. In this case, an identifier similar to an identifier of a corresponding label name is stored and associated with the label information table 25. Then, in step S43, the storage area information display control unit 13 performs control to update and display the scratch pad 60 on the display unit 34. With this control, information entered to the input field is displayed in the scratch pad 60. After that, the control unit 10 returns to the main processing.

Referring back to FIG. 13, in step S4, the control unit 10 determines whether a user's instruction to open another web page is accepted. If an instruction to open another web page is accepted (step S4: YES), the control unit 10 advances the processing to step S6, and performs web page processing of FIG. 16. On the other hand, if an instruction to open another web page is not accepted (step S4: NO), the control unit 10 advances the processing to step S5.

In step S5, the control unit 10 determines whether an instruction to jump to another web page is accepted. If an instruction to access another web page is accepted (step S5: YES), the control unit 10 advances the processing to step S6, and executes web page processing of FIG. 16. On the other hand, if an instruction to jump to another web page is not accepted (step S5: NO), the control unit 10 advances the processing to step S7. The term "instruction to open another web page" means to open a new web page in addition to the web page being opened, and the term "instruction to jump to another web page" means to open another web page in place of the web page being opened.

Referring now to FIG. 16, web page processing is described. In step S61, the control unit 10 accepts entry of address information (URL) of a web page with the user input device 32 to thereby acquire the web page, for example. In step S62, the label information acquisition unit 12 extracts label information from the acquired web page. In step S63, the control unit 10 determines whether the retrieved label information is already stored in the storage area 21. If already stored (step S63: YES), the control unit 10 advances the processing to step S66. On the other hand, if not stored (step S63: NO), the control unit 10 advances the processing to step S64.

In step S64, the control unit 10 references the synonym table 22 to determine whether the acquired label information is stored as being synonymous with a label name already stored in the storage area 21. If the information is stored as a synonym (step S64: YES), the control unit 10 advances the processing to step S65. On the other hand, if the information is not stored as a synonym (step S64: NO), the control unit 10 advances the processing to step S68.

In step S65, the control unit 10 puts the retrieved label information into the same group as the stored label name, as a synonym therefore. Then, the control unit advances the processing to step S66. In step S66, the control unit 10 extracts input information corresponding to the label information stored in the storage area 21. If plural input information corresponding to the label information is found, the latest input information is extracted. Then, in step S67, the web page display control unit 14 performs control to display the web page on the display unit 34 with the extracted input information being stored in a predetermined input field. After that, the control unit 10 returns to the main processing.

On the other hand, in step S68, since a target label is not stored in the storage area 21, the web page display control unit 14 performs control to display the web page on the display unit 34. To elaborate, no information is entered to an input field on the web page displayed in step S68 input field. If plural labels are set on the web page, the processing in step S63 and subsequent steps is performed on the retrieved labels. After that, the control unit 10 returns to the main processing.

Referring back to FIG. 13, in step S7, the control unit 10 determines whether an instruction to display correspondence is accepted. If an instruction to display correspondence is accepted (step S7: YES), the control unit 10 advances the processing to step S8. If an instruction to display correspondence is not accepted (step S7: NO), the control unit 10 advances the processing to step S9. In step S8, the correspondence display control unit 15 performs control to display designated correspondence. The term "designated correspondence" means a correspondence selected by a user, and refers to one or both of a label and an input field. Here, to display correspondence means to display correspondence as shown in FIG. 12 in a user-recognizable manner.

In step S9, it is determined whether the web page is closed. If the web page is closed (step S9: YES), the control unit 10 advances the processing to step S10. On the other hand, if the web page is not closed (step S9: NO), the control unit 10 advances the processing to step S2. In step S10, it is determined whether all web pages are closed. If all web pages are closed (step S10: YES), the control unit 10 advances the processing to step S11. On the other hand, if all web pages are not closed (step S10: NO), the control unit 10 advances the processing to step S2.

In step S11, the control unit 10 executes termination processing. To be specific, the storage area information erasing unit 16 erases information stored in the storage area 21, and the browser control unit 11 terminates the scratch pad program 29 together with the web browser 28. After that, the control unit 10 terminates this processing.

As described above, information stored in the storage area is erased in response to closing all the web browsers, making it possible to reduce the total amount of information stored in the storage area. Further, information in the storage area is erased upon the completion of closing all the web browsers, which raises a security level with no data being left in the terminal or server.

Figure 17:
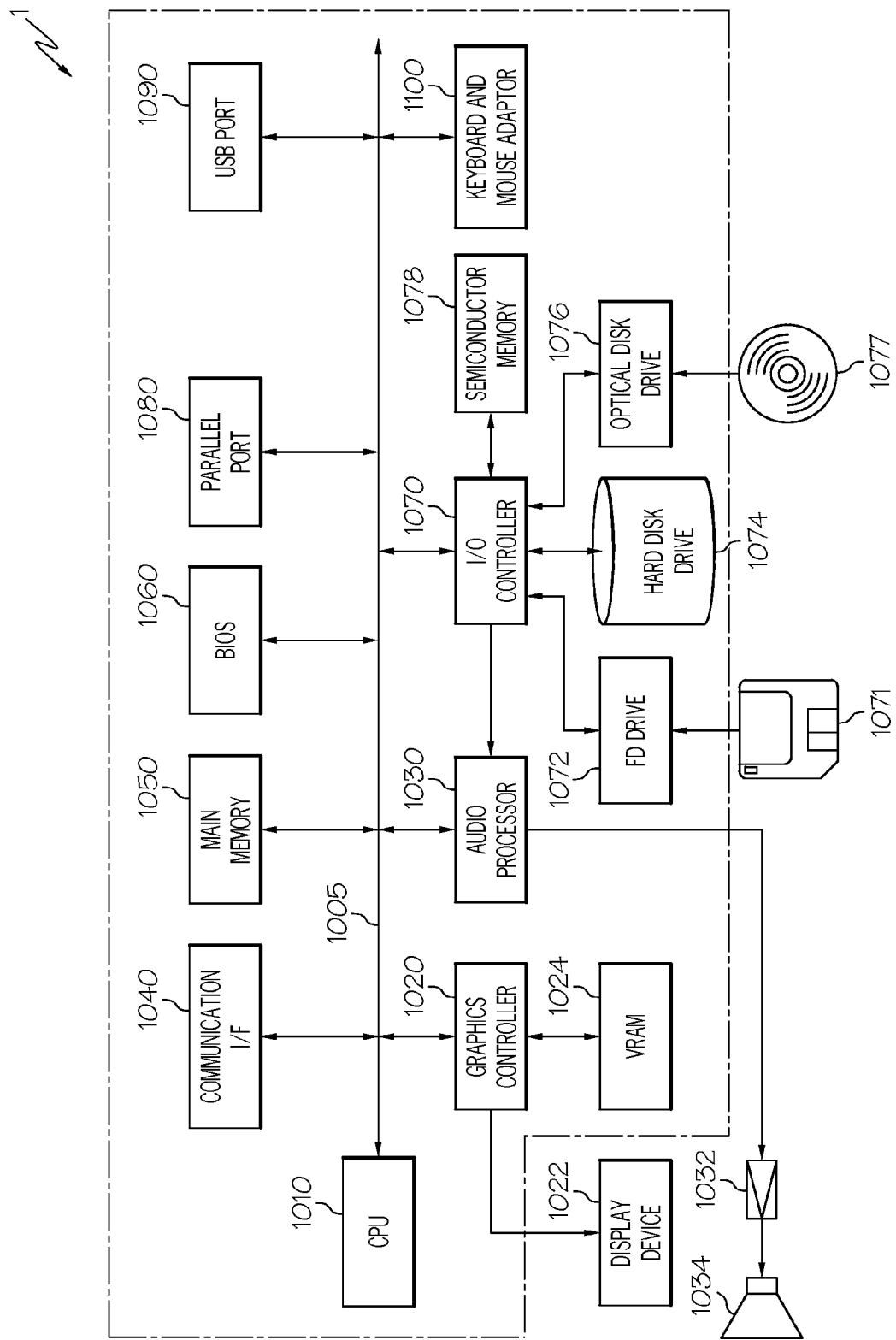
FIG. 17 shows the hardware configuration of a terminal.

FIG. 17 shows the hardware configuration of the terminal 1 according to the embodiment of the present invention. The overall configuration of an information processing apparatus typified by a computer is described below, but needless to say, if any special devices or embedded devices are used, the minimum configuration can be selected based on the device's environments.

The terminal 1 includes a CPU (central processing unit) 1010, a bus line 1005, a communication I/F 1040, a main memory 1050, a BIOS (basis input output system) 1060, a parallel port 1080, a USB port 1090, a graphics controller 1020, a VRAM 1024, an audio processor 1030, an I/O controller 1070, and an input unit such as a keyboard and a mouse adaptor 1100. The I/O controller 1070 can be connected to a storage unit such as a flexible disk (FD) drive 1072, a hard disk drive 1074, an optical disk drive 1076, and a semiconductor memory 1078. The graphics controller 1020 is connected to a display device 1022. Further, the audio processor 1030 is optionally connected to an amplifier circuit 1032 and a speaker 1034.

The BIOS 1060 stores a boot program executed by the CPU 1010 at the time of booting the terminal 1, and programs dependent on hardware of the terminal 1. The FD drive 1072 reads programs or data from a flexible disk 1071 and supplies the programs or data to a main memory 1050 or a hard disk 1074 through an I/O controller 1070.

Conceivable examples of the optical disk drive 1076 include a DVD-ROM drive, a CD-ROM drive, a DVD-RAM drive, DVD-RW drive, and a CD-RW drive. In this example, it is necessary to use the optical disk 1077 adaptable to each drive. The optical disk drive 1076 may read programs or data from the optical disk 1077 and supply the programs or data to the main memory 1050 or hard disk 1074 through the I/O controller 1070.

A computer program product is supplied to the terminal 1 by a user in the form of being stored in the flexible disk 1071, the optical disk 1077, or a memory card and other such recording media. The computer program product is read from the recording medium through the I/O controller 1070 or downloaded through a communication I/F 1040, and then installed and executed on the terminal 1. Operations executed by an information processing apparatus under the control of a computer program product are the same as the operations of the above-described apparatus and thus not described here.

The above computer program product may be stored in an external storage medium. Conceivable examples of the storage medium include the flexible disk 1071, the optical disk 1077, and the memory card, and in addition, a photo magnetic recording medium such as an MD and a tape medium. In addition, a storage device such as a hard disk drive or optical disk library provided in a server system connected to the Internet or a special communication line may be used as a recording medium to supply the computer program product to the terminal 1 through a communication line.

The above description is focused on the terminal 1. However, similar functions to those of the above information processing apparatus can be realized by installing a program having such functions to a computer and processing the computer to operate as the information processing apparatus. Accordingly, the information processing apparatus described as one embodiment of the present invention can be implemented by a method and a computer program product for performing the method.

The terminal 1 of the present invention can be embodied in the form of hardware, software, or combination of hardware and software. To give a typical example of the terminal embodied as a combination of hardware and software, the hardware and software are implemented in a computer system storing a predetermined program. In this example, the predetermined program is loaded and opened on the computer system to thereby process the computer system to execute the processing of the present invention. This program is composed of a command group that can be represented in any language, code, or notation. Such a command group can be executed after a system directly performs a predetermined function or one or both of the following operations (1) and (2) are performed: (1) the program is converted to another language, code, or notation and (2) the program is copied to another medium. Needless to say, the scope of the invention encompasses not only the program itself but also a program product inclusive of a medium storing the program. Programs for realizing the functions of the present invention can be stored in any computer-readable medium such as a flexible disk, an MO, a CD, a DVD, a hard disk device, a ROM, an MRAM, or a RAM. Such a program can be downloaded from another computer system connected to a communication line or copied from another medium to be stored in a computer-readable medium. Further, this program may be also compressed or divided into plural programs, and then stored in one or more recording media.

The present invention is discussed as above based on the embodiments but is not limited to the above embodiments. As for the advantages described in the embodiments of the present invention beneficial effects, the most beneficial effects of the present invention are simply listed. Thus, the advantages of the present invention are not limited to those described in the embodiments or examples.

In the embodiments of the present invention, input information is displayed in a scratch pad in response to movement of a cursor but may be displayed in response to key input or jump to a web page based on a designated URL.

Further, in the embodiments of the present invention, the web browser is activated and the scratch pad is displayed at the same time. However, for example, a scratch pad start button may be added to the task bar and pressed by a user to thereby activate and display the scratch pad.

Further, the embodiments of the present invention describe search for travel for illustrative purposes. However, if a user can jump to a weather information web page upon checking the weather after the search for travel, he/she can automatically set the date and share data between different web pages, for example. Moreover, the present invention is applicable to various purposes such as comparison of various products and entry of desired conditions on job-search/transfer web sites.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A system for inputting data to a web page that is selectively accessed and displayed through a web browser, said system comprising:
 a terminal;
 a storage area on the terminal to store label information and input information, wherein:
  at the time of activating the web browser, the storage area is initialized after which the storage area contains no information; and
  in response to movement of a cursor from a data entry field, input information corresponding to the data entry field is stored in the storage area;
 an electronic scratch pad stored in the storage area on said terminal that is configured to identify data entry fields on an accessed web page and to retrieve a number of first labels corresponding to any identified data entry field of said accessed web page; and
 a synonym table stored in the storage area that associates label names with a four digit synonym identifier, wherein label names having the same four digit synonym identifier are identified as synonyms;
 in which:
  said electronic scratch pad records said number of first labels and any user input that is input into a data entry field of the accessed web page, said user input and said number of first labels stored by said scratch pad being continuously displayed to a user of said computing device while said web browser is open;
  in response to said web browser activating a new web page, said electronic scratch pad automatically enters a latest user input from multiple user inputs for a corresponding label into a data entry field on said new web page that has a second label that corresponds to one of said number of first labels for a data entry field from a previous web page into which that user input was previously entered; and
  in response to said second label on said new web page being a synonym with said one of said first label from said accessed web page, updating the corresponding label information on said scratch pad to indicate both the first label and the second label.

2. The system of claim 1, wherein the synonym table that equates different, synonymous labels for said data entry fields.

3. The system of claim 1, in which said computing device comprises a display unit on which both said web browser and said electronic scratch pad are displayed.

4. The system of claim 3, in which said display unit displays lines drawn between labels for data entry fields shown on said electronic scratch pad and corresponding labels on a currently-accessed web page in said web browser for data entry fields of said currently-accessed web page.

5. The system of claim 3, in which said display unit displays lines drawn between previous user input shown on said electronic scratch pad and corresponding data entry fields of said currently-accessed web page.

6. The system of claim 1, in which said electronic scratch pad accepts user input made with said user input device directly to said electronic scratch pad and stores that user input in association with a designated label.

7. The system of claim 1, further comprising:
a label information table listing a number of extracted labels and an identifier for each extracted label; and
an input information table to associate input information with an extracted label, the input information table comprising extracted input information and an identifier of a corresponding extracted label.

8. The system of claim 1, wherein the user input that is input using a user input device is a search parameter.

9. A method for inputting data to a web page that is selectively accessed and displayed through a web browser executing on a computing device, said method comprising:
identifying data entry fields on an accessed web page with an electronic scratch pad on said computing device and retrieving a first label corresponding to any identified data entry field of said web page based on a positional relation to the identified data entry field, in which the first label is a string in a source code which describes the web page;
recording said first label with said electronic scratch pad;
recording, in response to movement of a cursor from a corresponding data entry field, in said electronic scratch pad any user input that is input using a user input device to the corresponding data entry field;
associating, in a synonym table, label names with a four digit synonym identifier, wherein label names having the same four digit synonym identifier are identified as synonyms;
in response to a second label on a new web page being a synonym with said first label from said accessed web page, updating the corresponding label information on said scratch pad to indicate both the first label and the second label;
terminating said electronic scratch pad together with the web browser when all web pages are closed; and
erasing said stored user input in response to said web browser closing.

10. The method of claim 9, further comprising:
accessing said new web page with said web browser; and
automatically entering user input with said electronic scratch pad from a previous web page into a data entry field on said new web page that has said second label that corresponds to the first label for a data entry field from a previous web page into which that user input was previously entered.

11. The method of claim 10, further comprising equating different, synonymous labels for said data entry fields using the synonym table stored in a storage unit of said computing device.

12. The method of claim 10, further comprising displaying both said web browser and said electronic scratch pad on a display device of said computing device.

13. The method of claim 10, in which, upon selection by a user with said user input device of previous user input displayed in said electronic scratch pad, entering that selected previous user input into a corresponding data entry field of a currently-accessed web page.

14. The method of claim 13, in which said selection by a user comprises dragging said previous user input from a display of said electronic scratch pad and dropping said previous user input in said corresponding data entry field of said currently-accessed web page.

15. The method of claim 14, further comprising displaying lines drawn between labels for data entry fields shown on said electronic scratch pad and corresponding labels on a currently-accessed web page in said web browser for data entry fields of said currently-accessed web page.

16. A computer program product for inputting data to a web page that is selectively accessed and displayed through a web browser executing on a computing device, said computer program product comprising a non-transitory computer readable storage medium having computer readable program code embodied therewith for an electronic scratch pad, the computer readable program code comprising:
computer readable program code configured to:
initialize a storage area of a terminal after activating the web browser, wherein after initialization the storage area contains no information;
identify data entry fields on a web page accessed by said web browser and to retrieve a number of first labels corresponding to any identified data entry field of said web page,
record said number of first labels;
in response to movement of a cursor from a corresponding data entry field, record any user input that is input using a user input device to the corresponding data entry field, in which said user input and said number of first labels stored by said scratch pad are continuously displayed to a user of said computing device while said web browser is open,
assign a four digit identifier to each first label, wherein labels having the same four digit identifier are identified as synonyms;
in response to said web browser activating a new web page, automatically entering user input from a previous web page into a data entry field on said new web page that has a second label that corresponds to one of said number of first labels for a data entry field from a previous web page into which that user input was previously entered;
in response to said second label on said new web page being a synonym with said one of said first label, based on the four digit identifiers for the second label and first label, from said accessed web page, updating the corresponding label information on said scratch pad to indicate both the first label and the second label; and
in response to identifying a new label on said new web page, adding said new label to said scratch pad without storing corresponding input information in said scratch pad.

17. The computer program product of claim 16, in which said electronic scratch pad selectively inputs said user input to a data entry field of a subsequent web page accessed by said web browser where said second label for said data entry field of said subsequent web page corresponds to one of the number of first labels for a data entry field into which said user input was originally entered by a user.

18. The system of claim 1, wherein said electronic scratch pad records multiple user inputs for a corresponding label.

19. The system of claim 18, wherein automatically entering user input from a previous web page into a data entry field on said new web page comprises entering a latest user input from the multiple user inputs.

20. The system of claim 18, wherein the web browser displays a travel search web site.

\* \* \* \* \*